(No Model.)
F. W. N. E. HAYN.
SELF LUBRICATING CONTACT BAR FOR ELECTRIC RAILWAYS.
No. 530,416. Patented Dec. 4, 1894.
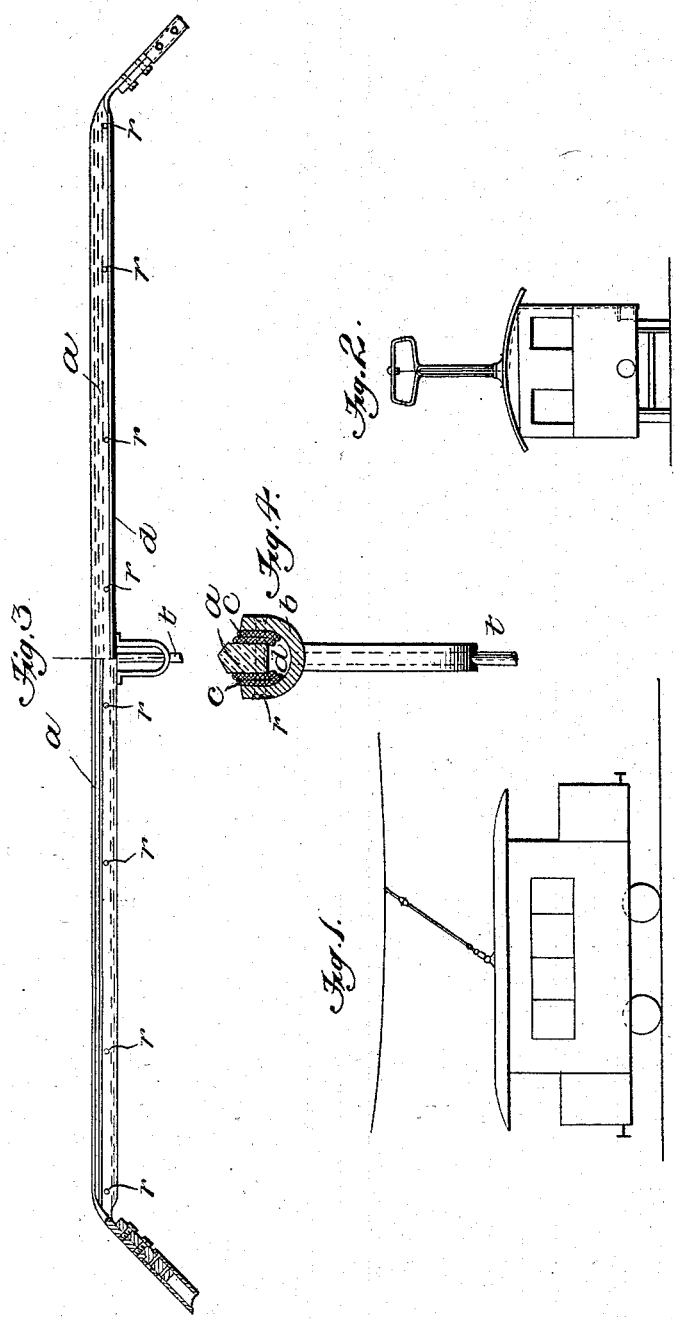
Witnesses
Inventor
Friedrich Wilhelm Nikolaus Emil Hayn
By
Geo. H. Benjamin,
Attorney

UNITED STATES PATENT OFFICE.

FRIEDRICH WILHELM NIKOLAUS EMIL HAYN, OF BERLIN, GERMANY, ASSIGNOR TO SIEMENS & HALSKE, OF SAME PLACE.

SELF-LUBRICATING CONTACT-BAR FOR ELECTRIC RAILWAYS.

SPECIFICATION forming part of Letters Patent No. 530,416, dated December 4, 1894.

Application filed May 12, 1894. Serial No. 511,067. (No model.)

*To all whom it may concern:*

Be it known that I, FRIEDRICH WILHELM NIKOLAUS EMIL HAYN, a subject of the Emperor of Germany, residing at Berlin, Germany, have invented new and useful Improvements in a Self-Lubricating Contact-Bar for Electric Railways, of which the following is a specification.

This invention relates to such electric railways in which the working current is transferred from the generating station to the rolling stock by stationary air conductors and a sliding contact fixed on the car, and sliding along the aforesaid conductors. In such electric railway systems there are two kinds of sliding contacts universally in use, the trolley wheel or shoe and the horizontal bar or wire extended above the car at right angles to the stationary conductor, the latter device having been introduced more lately.

The invention relates to this latter kind of sliding contacts and consists in a lubricating device adapted to diminish friction and noise caused by the sliding of the aforesaid horizontal wire or bar along the stationary wire.

Of the accompanying drawings forming a part of this specification, Figures 1 and 2 are diagrammatic views of the general arrangement of the horizontal bar or wire above the roof of the car so as to make clear the mode of its application. Fig. 3 is a view showing the details of construction of the aforesaid horizontal wire or bar and lubricating device. Fig. 4 is a cross section of the aforesaid contact-bar showing the detail of its construction.

The same letters of reference indicate the same parts in all figures.

*a* represents the sliding bar proper which I preferably make of brass or any other suitable material.

*b* is a U-shaped rail which may be made of aluminium or brass or any other suitable material.

*c c* are layers of wick or felt or any other suitable spongy substance.

*d* is a hollow or tubular space formed along the whole or any suitable length of the contact-bar by the U-shaped rail *b* the contact-bar proper *a* and the layers of felt or wick.

*t* is a tube fixed in the U-shaped rail *b* and adapted to transfer the lubricant from the vessel in which it is kept and which is suitably situated on the car to the tubular space or hollow *d*.

*r r* are rivets or bolts adapted to suitably hold together the whole system.

The operation of my self-lubricating contact-bar is as follows: The lubricant is kept in a suitable vessel situated on the car, the lubricant being subjected to a certain pressure by any suitable and known means. By means of this pressure it is forced upward through the tube *t*, until it fills the whole of the hollow *d*. After that it gradually soaks through the layers of felt, and partly by the friction with the stationary conductor, partly by its own capillary action spreads out over the exposed surface of the contact-bar proper. By suitably regulating the pressure to which the lubricant is exposed a perfectly constant and satisfactory lubrication is obtained thereby lessening the wear and tear of the stationary conductors and of the contact-bar and the noise caused by the friction of the latter against the former.

Having now particularly described and ascertained the nature of the said invention and in what manner the same is to be performed, it is declared that what I claim is—

1. A transversely extending contact bar for transmitting the working current from the stationary working conductor to the motor carried on an electro-motor vehicle of an electric railway, said bar having a hollow or tubular space along its whole length or a suitable part of its length, strips or layers of wick or felt or any other suitable spongy material connecting the said tubular space with the outer air, and a tube connecting the said tubular space with a vessel carried on the car and containing a suitable lubricant subjected by any suitable known means to a suitable pressure, substantially as described.

2. A transversely extending contact bar for transmitting the working current from the stationary working conductor to the motor carried on an electro-motor vehicle of an electric railway, said bar being freely movable transversely in contact with said stationary conductor and having a hollow or tubular space along its whole length or a suitable part of its length, strips or layers of wick or felt or any other suitable spongy material connecting the said tubular space with the outer air, and a tube connecting the said tubular space with a vessel carried on the car and containing a suitable lubricant subjected by any suitable known means to a suitable pressure, substantially as described.

3. A metallic contact bar for transmitting the working current from the stationary working conductor to the motor carried on an electro-motor vehicle of an electric railway, said bar having direct contact with the stationary conductor, and being provided with an adjacent receptacle for a suitable lubricant, suitable porous or spongy material, communicating with the receptacle, for conducting the lubricant to the working surface of the contact bar, and a tube connecting the receptacle with a vessel carried on the car and containing such lubricant subjected by any suitable means to a suitable pressure, substantially as described.

4. A metallic contact bar for transmitting the working current from the stationary working conductor to the motor carried on an electro-motor vehicle of an electric railway, said bar having direct contact with the stationary conductor, a tube, leading to the contact bar, from a vessel carried on the car and containing such lubricant subjected by any suitable means to a suitable pressure, and means for distributing the lubricant therefrom over the working surface of the contact bar, substantially as described.

5. A metallic contact bar for transmitting the working current from the stationary working conductor to the motor carried on an electro-motor vehicle of an electric railway, having vertical sides and a beveled or inclined contact surface extending there-between, a receptacle for a lubricant adjacent to said bar, porous or spongy material against said sides for conveying the lubricant to the contact surface, extending from said receptacle, and a tube connecting the receptacle with a vessel carried on the car and containing such lubricant subjected by any suitable means to a suitable pressure, substantially as described.

6. A metallic contact bar for transmitting the working current from the stationary working conductor to the motor carried on an electro-motor vehicle of an electric railway, an open-topped receptacle for a lubricant, beneath said contact bar, porous or spongy material, which, with the contact bar, closes the top of the receptacle, and a tube connecting the receptacle with a vessel carried on the car and containing such lubricant subjected by any suitable means to a suitable pressure, substantially as described.

7. In a contact-bar for the purpose aforesaid consisting of a U-shaped rail $b$ a contact-bar proper $a$ adapted to fit loosely into the opening of the aforesaid rail and layers or strips of wick or felt adapted to fill up the chinks formed between the contact-bar proper and the edges of the U-shaped rail, the whole being held together by bolts or rivets and forming thereby a tubular space or hollow $d$, as described and drawn and for the purpose set forth.

In testimony whereof I affix my signature in the presence of two witnesses.

FRIEDRICH WILHELM NIKOLAUS EMIL HAYN.

Witnesses:
OSCAR BIELEFELD,
GUSTAV STENZEL.